(12) United States Patent
Kato (10) Patent No.: US 8,770,013 B2
(45) Date of Patent: Jul. 8, 2014

(54) EVAPORATION LEAK CHECK SYSTEM (75) Inventor: Yasuo Kato, Niwa-gun (JP)

(73) Assignee: Denso Corporation, Kariya (JP)

( * ) Notice: Subject to any disclaimer, the term of this patent is extended or adjusted under 35 U.S.C. 154(b) by 354 days.

(21) Appl. No.: 13/274,557

(22) Filed: Oct. 17, 2011

(65) Prior Publication Data

US 2012/0118046 A1 May 17, 2012

(30) Foreign Application Priority Data

Nov. 11, 2010 (JP) ................................. 2010-252701

(51) Int. Cl.
*G01M 3/28* (2006.01)
(52) U.S. Cl.
USPC ..................................................... 73/40.5 R
(58) Field of Classification Search
USPC ............................................ 73/40.5 R, 49.7
See application file for complete search history.

(56) References Cited

U.S. PATENT DOCUMENTS

| | | | | |
|---|---|---|---|---|
| 7,004,013 | B2 * | 2/2006 | Kobayashi et al. | 73/49.7 |
| 7,350,399 | B2 * | 4/2008 | Kobayashi et al. | 73/49.7 |
| 2004/0000187 | A1 | 1/2004 | Kobayashi et al. | |
| 2007/0051168 | A1 * | 3/2007 | Kato et al. | 73/49.7 |
| 2007/0062495 | A1 | 3/2007 | Kano et al. | |

* cited by examiner

*Primary Examiner* — Hezron E Williams
*Assistant Examiner* — Mark A Shabman
(74) *Attorney, Agent, or Firm* — Nixon & Vanderhye PC (57) ABSTRACT

A pump characteristics expression of a pump is developed based on a closed-state pressure detected when the pump is driven while a space between a pump passage and a first passage is closed, an open-time pressure detected immediately after the space is opened while the pump is operated, and a flow rate characteristics expression of the pump passage. A reference pressure is determined by an intersection point between the pump characteristics expression of the pump and a flow rate characteristics expression of an orifice having a predetermined passage area. A leak check portion determines whether a leak of fuel evaporation generated from a fuel tank is within an allowable range by comparing the reference pressure and a pressure detected when the pump is operated for a predetermined period while the space is opened.

4 Claims, 8 Drawing Sheets

EVAPORATION LEAK CHECK SYSTEM

CROSS REFERENCE TO RELATED APPLICATION

This application is based on Japanese Patent Application No. 2010-252701 filed on Nov. 11, 2010, the disclosure of which is incorporated herein by reference in its entirety.

BACKGROUND OF THE INVENTION

1. Field of the Invention

The present invention relates to an evaporation leak check system.

2. Description of Related Art

In recent years, emission control of fuel evaporation leaked from a fuel tank becomes severe. Especially US Environment Protection Agency (EPA) and California Air Resources Board (CARB) establish standard that requires detection of the evaporation leak from a minute opening in the fuel tank.

JP-B2-3896588 (US 2004/0000187) describes an evaporation leak check system. In the system, a reference pressure is defined by a pressure when air is made to flow through a reference orifice using a pump. Then, a pressure is detected when a fuel tank is decompressed or compressed by a pump, and the detected pressure is compared with the reference pressure. Thus, the system determines whether an evaporation leak amount from the fuel tank is within an allowable range or not.

In the system of JP-B2-3896588, air flowing through the reference orifice contains much foreign objects because the air is drawn from outside air, so that the reference orifice may be clogged by the foreign objects. If a diameter of the reference orifice is made smaller or if the reference orifice is completely closed by the foreign objects, the reference pressure is varied. In this case, the check of the evaporation leak may become inaccurate. If a filter that collects the foreign objects is arranged upstream of the reference orifice, the number of components included in the system is increased, and construction of the system may become complicated.

JP-A-2007-077950 (US 2007/0062495) describes an evaporation fuel handling apparatus. When a pump is driven in a state that a passage upstream or downstream of the pump is closed, a pressure in the passage is detected as a closed-state pressure. Further, a pressure difference is obtained between a pressure detected when air is made to flow through a reference orifice using a pump and a pressure detected when air containing evaporation fuel is made to flow through the reference orifice using the pump. A concentration of the evaporation fuel is calculated based on the pressure difference and the closed-state pressure. However, because it is necessary that each of the air or the air containing the evaporation fuel is made to flow through the reference orifice, the calculation of the concentration of the evaporation fuel may become inaccurate if the reference orifice is closed by foreign objects contained in the air or the air containing the evaporation fuel.

SUMMARY OF THE INVENTION

According to a first example of the present invention, an evaporation leak check system includes a fuel tank having fuel evaporation leak that is checked by forming a pressure difference between inside and outside of the fuel tank; a pump; a motor that drives the pump; a pump passage having a first end connected to the pump and a second end; a first passage having a first end connected to the fuel tank and a second end connected to the second end of the pump passage; a second passage having a first end released to atmospheric air and a second end connected to the second end of the first passage; a switching portion; a pressure detector arranged in the pump passage; an adsorbent arranged in the first passage; and a controller. The switching portion is configured to open a space between the first passage and the second passage when a space between the pump passage and the first passage is closed, and is configured to close the space between the first passage and the second passage when the space between the pump passage and the first passage is opened. The pressure detector detects an inside pressure of the pump passage. The adsorbent adsorbs evaporation fuel generated in the fuel tank. The controller controls an activation of the pump and an operation of the switching portion, and has a closed-state pressure detector; an open-time pressure detector; a pump characteristics expression developer; a reference pressure calculator; and a leak check portion. The closed-state pressure detector detects a closed-state pressure corresponding to the pressure detected by the pressure detector when the pump is driven in a state that the space between the pump passage and the first passage is closed by the switching portion. The open-time pressure detector detects an open-time pressure corresponding to the pressure detected by the pressure detector immediately after the space between the pump passage and the first passage is opened by the switching portion in a state that the pump is operated. The pump characteristics expression developer develops a pump characteristics expression of the pump based on the closed-state pressure, the open-time pressure and a flow rate characteristics expression of the pump passage. The reference pressure calculator calculates a reference pressure by calculating an intersection point between the pump characteristics expression of the pump and a flow rate characteristics expression of an orifice having a predetermined passage area. The leak check portion determines whether a leak of the fuel evaporation generated from the fuel tank is within an allowable range or not by comparing the reference pressure and a pressure detected by the pressure detector when the pump is driven for a predetermined period in a state that the space between the pump passage and the first passage is opened by the switching portion.

According to a second example of the present invention, an evaporation leak check system includes a fuel tank having fuel evaporation leak that is checked by forming a pressure difference between inside and outside of the fuel tank; a pump; a motor that drives the pump; a pump passage having a first end connected to the pump and a second end; a first passage having a first end connected to the fuel tank and a second end connected to the second end of the pump passage; a second passage having a first end released to atmospheric air and a second end connected to the second end of the first passage; a switching portion; a pressure detector arranged in the pump passage; a flow rate detector arranged in the pump passage; an adsorbent arranged in the first passage; and a controller. The switching portion is configured to open a space between the first passage and the second passage when a space between the pump passage and the first passage is closed, and is configured to close the space between the first passage and the second passage when the space between the pump passage and the first passage is opened. The pressure detector detects an inside pressure of the pump passage. The flow rate detector detects a flow rate of fluid flowing through the pump passage. The adsorbent adsorbs evaporation fuel generated in the fuel tank. The controller controls an activation of the pump and an operation of the switching portion, and has a closed-state pressure detector; an open-time flow rate detector; a pump characteristics expression developer; a reference pressure calculator; and a leak check portion. The closed-state pressure detector detects a closed-state pressure corresponding to the pressure detected by the pressure detector when the pump is driven in a state that the space between the pump passage and the first passage is closed by the switching portion. The open-time flow rate detector detects an open-time flow rate corresponding to the flow rate detected by the flow rate detector immediately after the space between the pump passage and the first passage is opened by the switching portion in a state that the pump is operated. The pump characteristics expression developer develops a pump characteristics expression of the pump based on the closed-state pressure, the open-time flow rate and a flow rate characteristics expression of the pump passage. The reference pressure calculator calculates a reference pressure by calculating an intersection point between the pump characteristics expression of the pump and a flow rate characteristics expression of an orifice having a predetermined passage area. The leak check portion determines whether a leak of the fuel evaporation generated from the fuel tank is within an allowable range or not by comparing the reference pressure and a pressure detected by the pressure detector when the pump is driven for a predetermined period in a state that the space between the pump passage and the first passage is opened by the switching portion.

BRIEF DESCRIPTION OF THE DRAWINGS

The above and other objects, features and advantages of the present invention will become more apparent from the following detailed description made with reference to the accompanying drawings. In the drawings:

FIG. 3 is a cross-sectional view illustrating the check module of the evaporation leak check system when the switching valve is turned on;

DETAILED DESCRIPTION OF PREFERRED EMBODIMENT

First Embodiment

Figure 1:
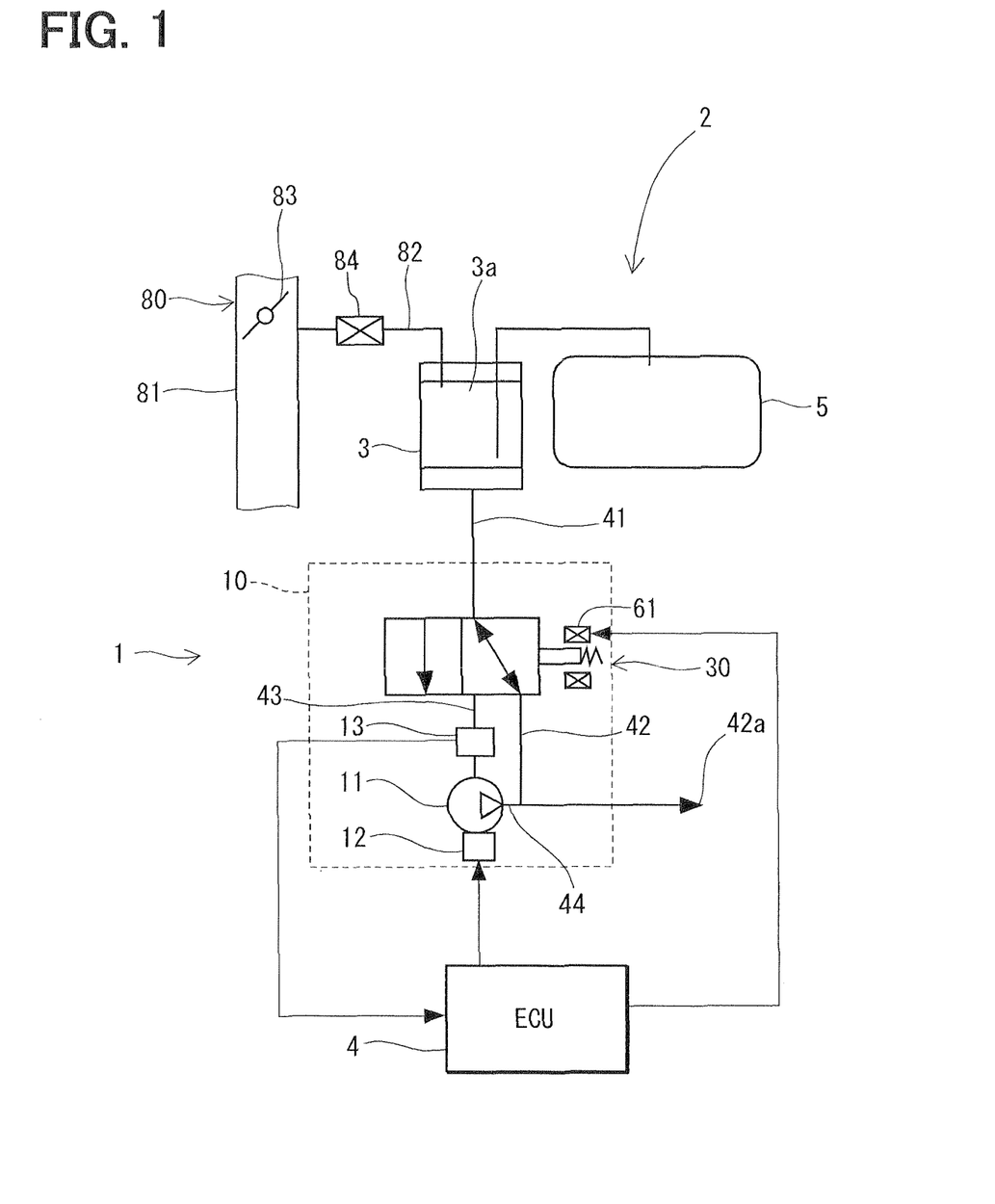
FIG. 1 is a block diagram illustrating an evaporation leak check system according to a first embodiment.

As shown in FIG. 1, an evaporation system 2 has a fuel tank 5, an air intake device 80 and an evaporation leak check system 1. The check system 1 has a check module 10, a canister 3 corresponding to an adsorbent and an electronic control unit (ECU) 4 corresponding to a controller.

Figure 2:
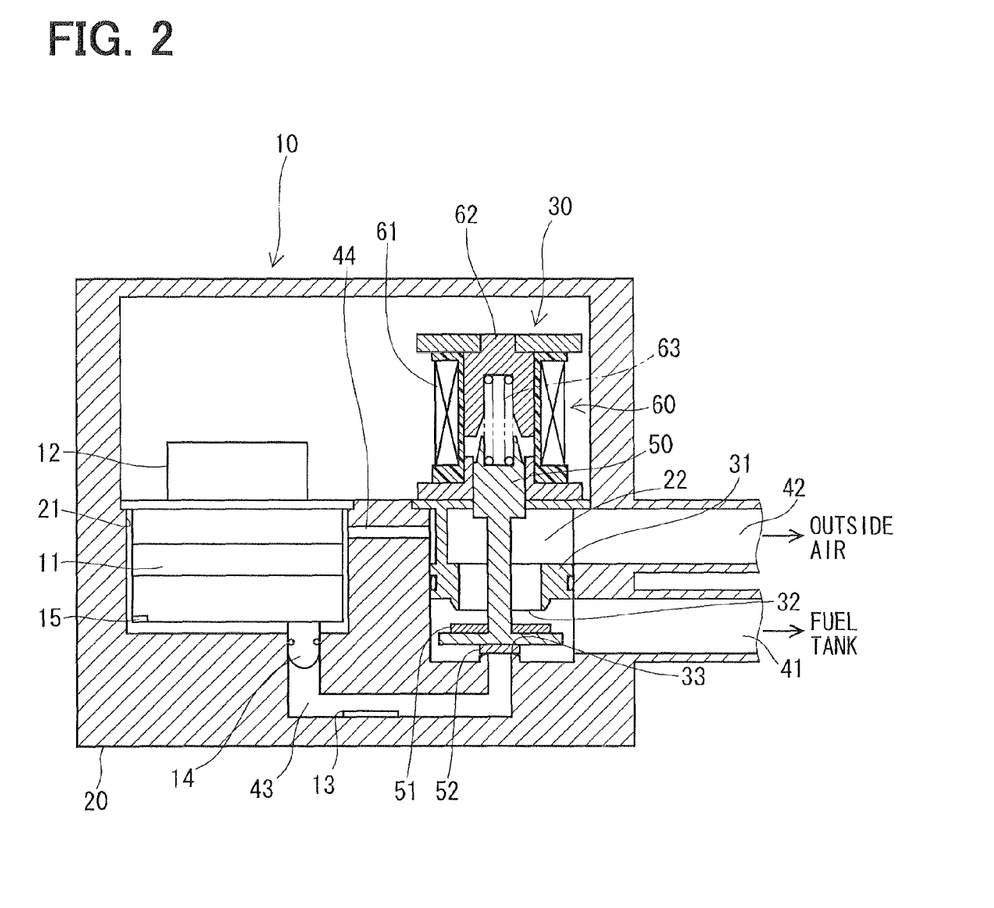
FIG. 2 is a cross-sectional view illustrating a check module of the evaporation leak check system when a switching valve is turned off.

As shown in FIG. 2, the check module 10 has a housing 20, a pump 11, a motor 12, a switching valve 30 corresponding to a switching portion, and a pressure sensor 13 corresponding to a pressure detector.

The housing 20 accommodates the pump 11, the motor 12, and the switching valve 30. The housing 20 has a pump chamber 21 accommodating the pump 11, and a valve chamber 22 accommodating the switching valve 30. The housing 20 has a tank passage 41 corresponding to a first passage, an open passage 42 corresponding to a second passage, a first pump passage 43 corresponding to a pump passage, and a second pump passage 44.

The valve chamber 22 of the housing 20 communicates with the tank passage 41, and the tank passage 41 communicates with the fuel tank 5 via the canister 3, as shown in FIG. 1. The open passage 42 has an open end 42a communicating with atmospheric air. The valve chamber 22 of the housing 20 of FIG. 2 is connected to the open end 42a.

As shown in FIG. 2, the first pump passage 43 connects the pump chamber 21 to the valve chamber 22. That is, the first pump passage 43 has a first end connected to the pump 11 via the pump chamber 21, and a second end. The tank passage 41 has a first end connected to the fuel tank 5, and a second end connected to the second end of the first pump passage 43 via the valve chamber 22.

The open passage 42 has a first end connected to atmospheric air and a second end connected to the second end of the tank passage 41 via the valve chamber 22. Thus, the first pump passage 43, the tank passage 41, and the open passage 42 are mutually connected through the valve chamber 22.

The second pump passage 44 connects the pump chamber 21 to the open passage 42 via the valve chamber 22. Air discharged from the pump 11 toward atmospheric air flows through the second pump passage 44.

The pump 11 is accommodated in the pump chamber 21, and has an inlet port 14 and an outlet port 15. The inlet port 14 is located in the first pump passage 43, and the outlet port 15 is located in the pump chamber 21. Air of the first pump passage 43 is drawn into the pump 11 when the pump 11 is driven by the motor 12.

The motor 12 is an electrically-non-contact DC brushless motor in which a needle (not shown) is rotated by changing energization position of a coil (not shown). As shown in FIG. 1, the motor 12 is connected to the ECU 4.

As shown in FIG. 2, the switching valve 30 has a valve body 31, a valve 50, and an electromagnetism actuator 60. The valve body 31 is accommodated in the valve chamber 22 of the housing 20, and has a first valve seat 32 opposing to the tank passage 41. A washer 51 is mounted to the valve 50, and contacts the first valve seat 32.

Figure 3:
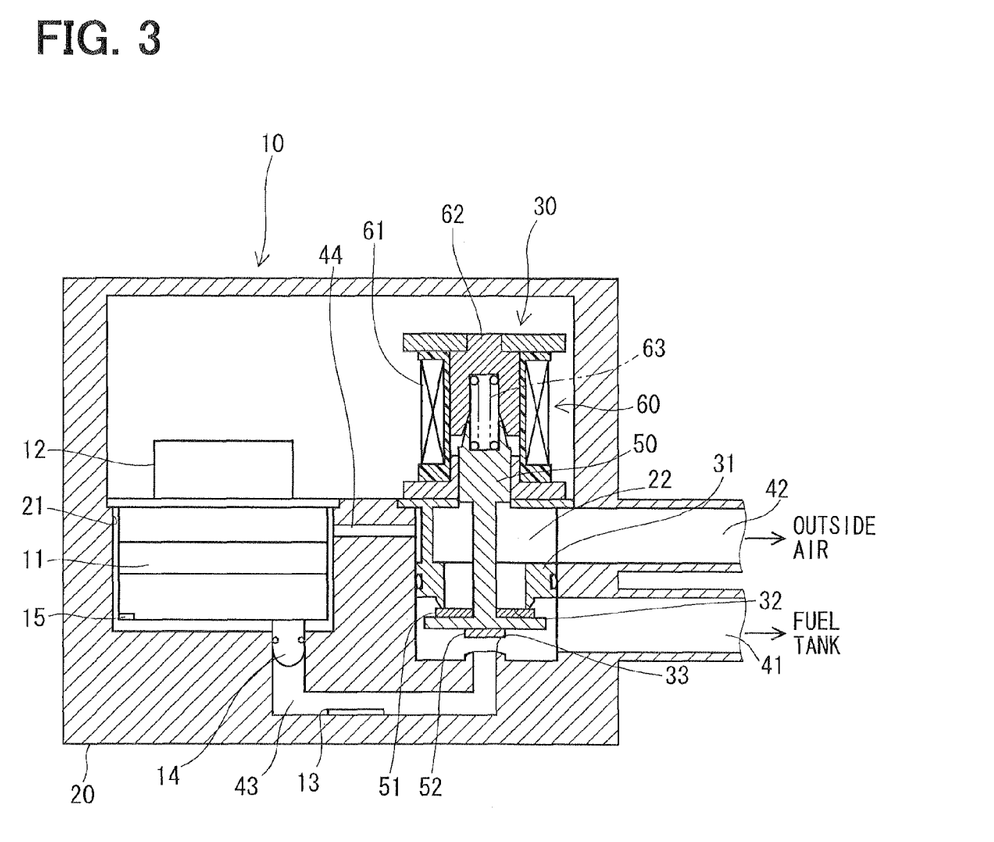

If the washer 51 contacts the first valve seat 32 when the valve 50 is moved, as shown in FIG. 3, a space between the tank passage 41 and the open passages 42 is blocked, and a space between the tank passage 41 and the first pump passage 43 is opened. The valve 50 has a contact part 52 that contacts a second valve seat 33. The second valve seat 33 is defined at an end of the first pump passage 43 opposing to the valve chamber 22.

If the contact part 52 contacts the second valve seat 33 when the valve 50 is moved, as shown in FIG. 2, the space between the tank passage 41 and the open passages 42 is opened, and the tank passage 41 and the open passage 42 are disconnected from the first pump passage 43.

That is, the switching valve 30 connects the tank passage 41 to the open passage 42, when the space between the first pump passage 43 and the tank passages 41 is closed. Further, the switching valve 30 disconnects the tank passage 41 from the open passage 42, when the space between the first pump passage 43 and the tank passages 41 is opened.

The valve 50 is driven by the electromagnetism actuator 60. The contact part 52 of the valve 50 is located at an end of the valve 50 opposite from the electromagnetism actuator 60, and the washer 51 is mounted to the valve 50.

The electromagnetism actuator 60 has a coil 61 connected to the ECU 4 of FIG. 1. A magnetic field is generated in a core 62 of the actuator 60 by energizing the coil 61, and the valve 50 is attracted to the core 62. The valve 50 is biased by a spring 63 in a direction opposite from the attracting direction of the coil 61.

When energizing of the coil 61 is stopped, as shown in FIG. 2, the valve 50 is moved downward by the biasing force of the spring 63, and the contact part 52 contacts the second valve seat 33. Therefore, at this time, the space between the tank passage 41 and the open passage 42 is opened, and the space between the first pump passage 43 and the tank passage 41 is closed. That is, the end of the first pump passage 43 is shut by the contact part 52.

In contrast, when the coil 61 is energized, as shown in FIG. 3, the valve 50 is attracted to the core 62 against the biasing force of the spring 63, and the valve 50 stops at a position where the washer 51 and the first valve seat 32 contact with each other. Therefore, the space between the tank passage 41 and the open passages 42 is blocked, and the space between the tank passage 41 and the first pump passages 43 is opened.

The pressure sensor 13 is arranged in the first pump passage 43. The pressure sensor 13 detects pressure of the first pump passage 43, and outputs a signal corresponding to the detected pressure to the ECU 4.

The ECU 4 has a microcomputer including CPU, ROM, and RAM (not shown), and controls each part of the engine relating to the check module 10. Signals output from various sensors including the pressure sensor 13 are input into the ECU 4. The ECU 4 controls each part of the engine according to a predetermined control program currently recorded in the ROM based on the signals. The ECU 4 is connected to motor 12 and the coil 61, and controls a rotation of the motor 12 and an activation of the coil 61. That is, the ECU 4 controls an activation of the pump 11, and an operation of the switching valve 30.

As shown in FIG. 1, the canister 3 has adsorbent 3a. The adsorbent 3a may be activated carbon, for example, and adsorbs evaporation fuel generated in the fuel tank 5. The canister 3 is disposed in the tank passage 41 that connects the valve chamber 22 of the housing 20 to the fuel tank 5.

A purging passage 82 is connected to the canister 3, and communicates with an intake pipe 81 of the air intake device 80. Evaporation fuel generated in the fuel tank 5 is adsorbed by the adsorbent 3a by passing through the canister 3, so that evaporation fuel contained in air flowing out of the canister 3 has a concentration equal to or lower than a predetermined value.

The inlet pipe 81 of the air intake device 80 communicates with an air intake system of the engine. A throttle valve 83 is arranged in the pipe 81, and adjusts a flow rate of intake air which flows inside of the inlet pipe 81. Further, a purge valve 84 is arranged in the purging passage 82. If the purge valve 84 is opened while intake air is flowing through the inlet pipe 81, a negative pressure is generated in the purging passage 82, and evaporation fuel adsorbed by the adsorbent 3a is purged into the inlet pipe 81.

Figure 4:
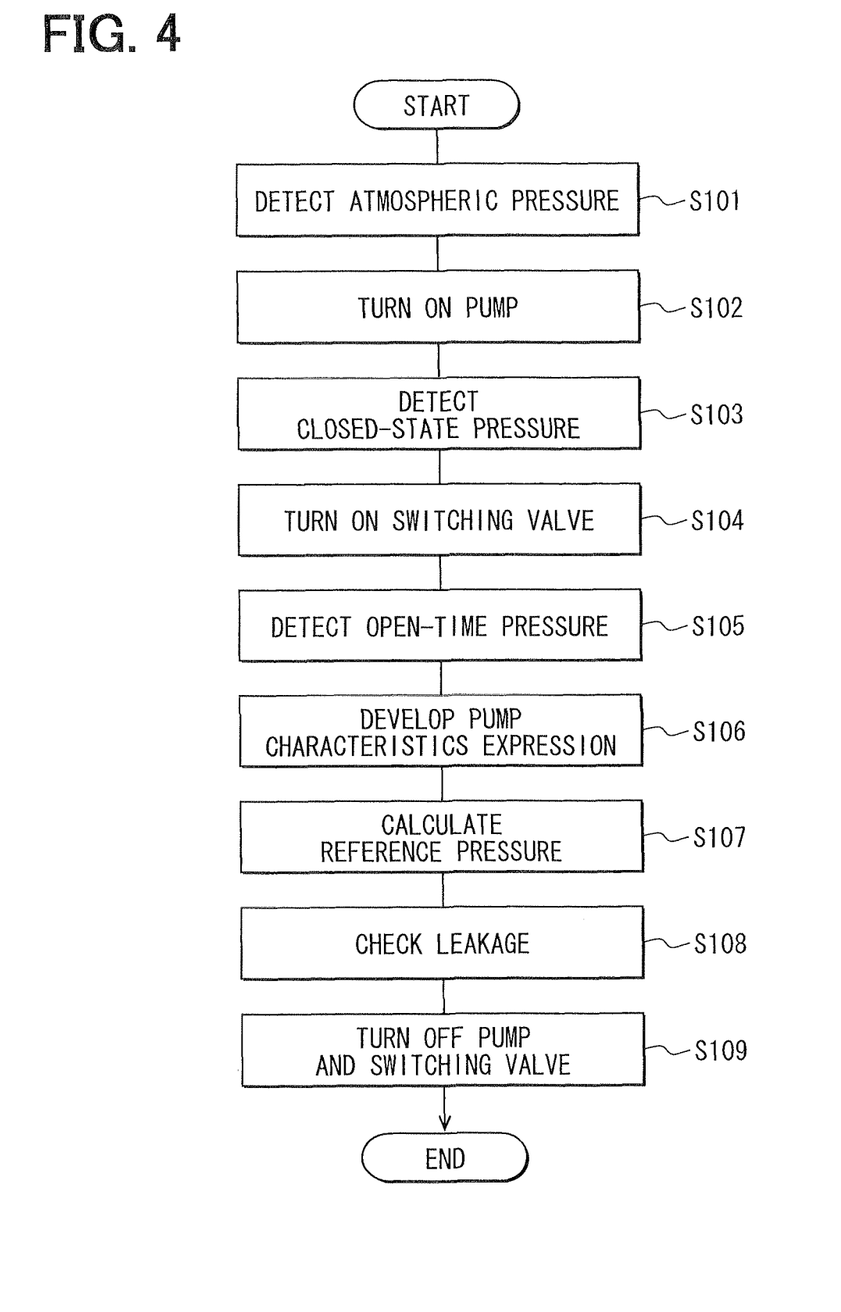
FIG. 4 is a flow chart illustrating a process of checking evaporation leak by the evaporation leak check system.
Figure 5:
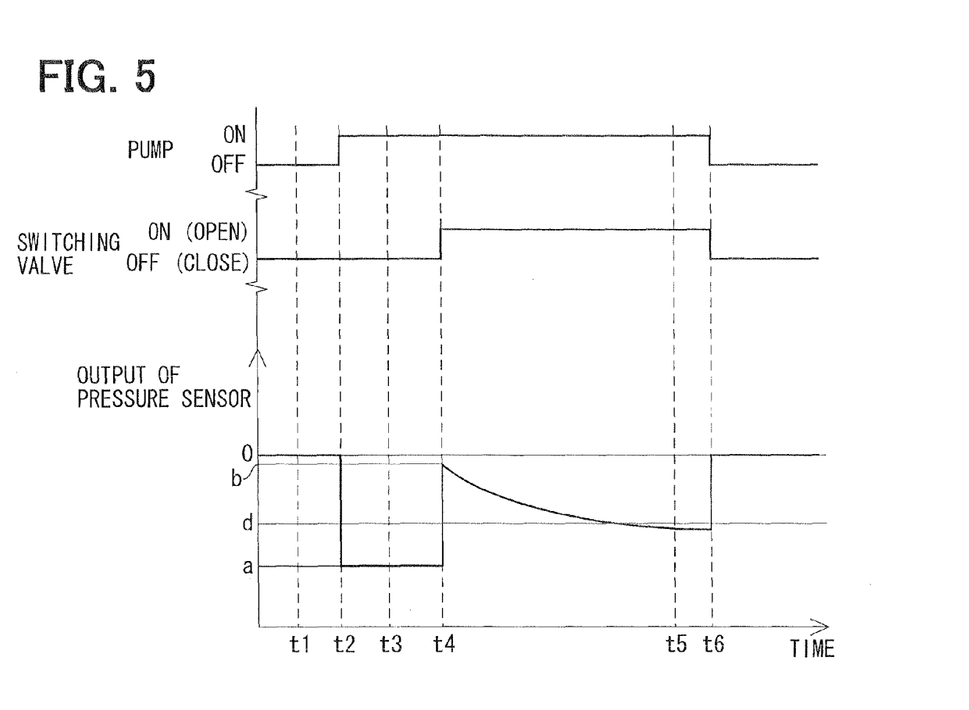
FIG. 5 is a time chart illustrating a change in output of a pressure sensor of the evaporation leak check system.

Next, operation of the check system 1 will be explained. A processing of FIG. 4 is performed by the ECU 4 so as to check the evaporation leak. FIG. 5 shows a change in output of the pressure sensor 13 with time elapse when the pump 11 and the switching valve 30 are controlled. The flow of FIG. 4 is started when a predetermined period passes after the engine is stopped. The predetermined period is set as a period necessary for stabilizing temperature of the vehicle.

In S101, the ECU 4 detects an atmospheric pressure. At this time (timing t1 shown in FIG. 5), the pump 11 and the switching valve 30 are not active, and the switching valve 30 has the state of FIG. 2, so that the space between the first pump passage 43 and the tank passage 41 is closed.

The other end of the first pump passage 43 adjacent to the pump 11 communicates with atmospheric air via the inside of the pump 11, the second pump passage 44, and the open passage 42. Therefore, a pressure detected with the pressure sensor 13 at this time corresponds to an atmospheric pressure. The ECU 4 memorizes a value of the signal output from the pressure sensor 13 at this time as a value corresponding to the atmospheric pressure in the RAM.

In S102, the ECU 4 activates the pump 11. At this time (timing t2 shown in FIG. 5), the inside of the first pump passage 43 is decompressed because the space between the first pump passage 43 and the tank passage 41 is closed.

In S103, the ECU4 operates as a closed-state pressure detector that detects a closed-state pressure. The closed-state pressure is a pressure of the first pump passage 43 when the pump 11 is activated in a state that the space between the first pump passage 43 and the tank passages 41 is closed. The ECU 4 calculates and memorizes a value corresponding to the closed-state pressure by subtracting the value corresponding to the atmospheric pressure memorized in S101 from a value of signal output from the sensor 13 at a timing t3 shown in FIG. 5, in the RAM.

Here, the value corresponding to the closed-state pressure is set as "a" in FIG. 5. Because the closed-state pressure is lower than the atmospheric pressure, "a" has a negative value. That is, absolute value of "a" represents a relative pressure difference between the atmospheric pressure and the closed-state pressure.

In S104, the ECU 4 activates the switching valve 30 at timing t4 shown in FIG. 5, thereby, the switching valve 30 has the state of FIG. 3.

S105 is executed immediately after S104, and the ECU 4 operates as an open-time pressure detector that detects an open-time pressure. The open-time pressure is a pressure of the first pump passage 43 when the space between the first pump passage 43 and the tank passages 41 is opened in the state where the pump 11 is active.

The ECU 4 calculates and memorizes a value corresponding to the open-time pressure by subtracting the value corresponding to the atmospheric pressure memorized in S101 from a value of signal output from the sensor 13 immediately after the timing t4 of FIG. 5, in the RAM.

Here, the value corresponding to the open-time pressure is set as "b" in FIG. 5. Because the open-time pressure is lower than the atmospheric pressure, "b" has a negative value. That is, absolute value of "b" represents a relative pressure difference between the atmospheric pressure and the open-time pressure.

In S106, the ECU 4 operates as a pump characteristics expression developer that develops an expression of pump characteristics of the pump 11. Specifically, the expression of the pump characteristics of the pump 11 is developed from the closed-state pressure "a" detected at S103, the open-time pressure "b" detected at S105 and "an expression of flow rate characteristic of the first pump passage 43".

The expression of flow rate characteristic of the first pump passage 43 is a following expression E1 that indicates a relationship between a pressure (P) and a flow rate (Q) when air is made to flow through the first pump passage 43 having a predetermined passage area in a state that a negative pressure is applied to the passage 43.

$$Q = \alpha_1 A_1 \sqrt{(2P/\rho)} \tag{E1}$$

Figure 6:
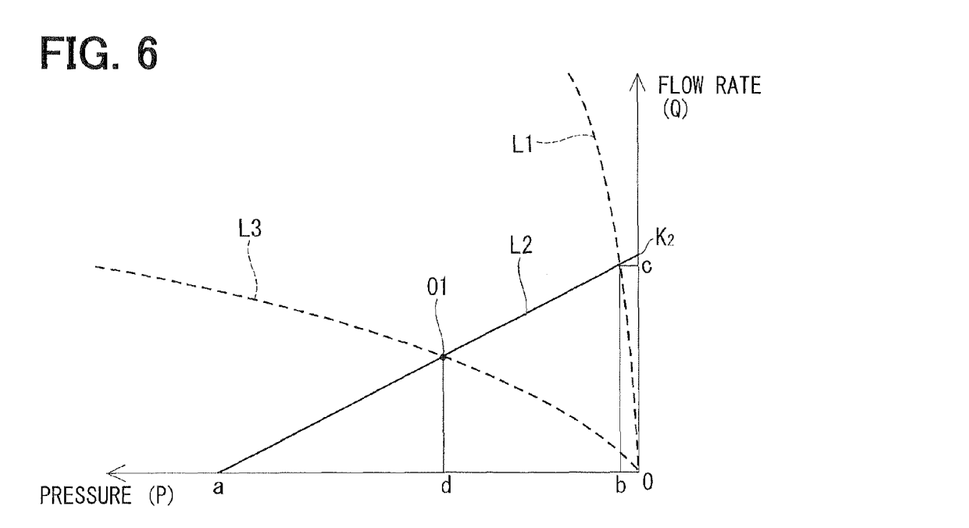
FIG. 6 is a graph illustrating a pump characteristics expression of a pump of the evaporation leak check system.

$\alpha_1$ is a flow rate coefficient of the first pump passage 43, and has a predetermined value. $A_1$ is a passage area of the first pump passage 43, and corresponds to the predetermined passage area. $\rho$ is a density of air (0° C., 1 atm), and has a predetermined value. P is a negative value. If the expression E1 is shown in a graph, a curve L1 of FIG. 6 is obtained. In addition, a passage diameter of the first pump passage 43 is set as about 2 mm, for example.

The expression of the pump characteristics of the pump 11 is a following expression E2 that indicates a relationship between a pressure (P) and a flow rate (Q) of fluid drawn into the pump 11, and is determined by properties of the pump 11.

$$Q = K_1 P + K_2 \tag{E2}$$

If the expression E2 is shown in a graph, a linear line L2 of FIG. 6 is obtained. $K_1$ is an inclination of the linear line L2 that represents a change ratio in the flow rate relative to the pressure. $K_2$ is a flow rate at a time of no-load.

The ECU 4 calculates an open-time flow rate of the first pump passage 43 by incorporating the open-time pressure "b" into the "P" of the expression E1. The calculated open-time flow rate is set as "c".

The ECU 4 calculates $K_1$ and $K_2$ of the expression E2 using the closed-state pressure "a", the open-time pressure "b" and the open-time flow rate "c". For example, the inclination $K_1$ is represented by a formula of c/(b−a).

That is, the ECU 4 calculates $K_1$ and $K_2$ based on the detected closed-state pressure "a" and the detected open-time pressure "b", thereby developing the expression E2 of the pump characteristics of the pump 11 at the timing of t4.

In S107, the ECU4 calculates a reference pressure as a reference pressure calculator. Specifically the reference pressure is computed by calculating an intersection point between the expression E2 of the pump characteristics of the pump 11 developed in S106 and "an expression of flow rate characteristic of an orifice having a predetermined passage area."

The expression of flow rate characteristic of the orifice having the predetermined passage area is represented by a following expression E3 that indicates a relationship between a pressure (P) and a flow rate (Q) when air is made to flow through the orifice having the predetermined passage area to which a negative pressure is applied.

$$Q = \alpha_2 A_2 \sqrt{(2P/\rho)} \tag{E3}$$

$\alpha_2$ is a flow rate coefficient of the orifice, and has a predetermined value memorized in the ROM. $A_2$ is the predetermined passage area of the orifice memorized in the ROM. $\rho$ is a density of air (0° C., 1 atm), and has a predetermined value memorized in the ROM. P is a negative value. The orifice is not actually arranged in the housing 20.

If the expression E3 is shown in a graph, a curve L3 of FIG. 6 is obtained. For example, a standard of CARB and EPA requires detection of evaporation leak from an opening having a diameter of ϕ0.5 mm as detection accuracy of the evaporation leak from the fuel tank 5. Therefore, a passage diameter of the orifice is set as ϕ0.5 mm. $A_2$ is specifically 0.0625 $\pi mm^2$.

As shown in FIG. 6, the ECU 4 calculates an intersection point O1 between the expression E2 (L2) and the expression E3 (L3), so as to obtain the reference pressure. A pressure value of the intersection point O1 is set as the reference pressure "d". That is, the reference pressure "d" corresponds to a pressure defined when air is made to pass through the orifice with the passage diameter of ϕ0.5 mm in a state where the negative pressure is applied to the orifice by driving the pump 11.

In S108, the ECU 4 operates as a leak check portion, and determines whether evaporation leak from the fuel tank 5 is within a tolerance level or not. Specifically, the pump 11 is activated for a predetermined period in a state where the space between the first pump passage 43 and the tank passages 41 is opened. At this time (timing t5 shown in FIG. 5), a pressure detected by the pressure sensor 13 and the reference pressure "d" obtained in S107 are compared with each other.

As shown in FIG. 5, at the timing t4, the switching valve 30 has the state of FIG. 3, and the pump 11 is in the active state. Therefore, inside pressure of the first pump passage 43, the tank passage 41, and the fuel tank 5 is lowered after the timing t4.

At a timing t5, that is when a predetermined period is elapsed from the timing t4, the pressure detected by the pressure sensor 13 (i.e., the inside pressure of the first pump passage 43, the tank passage 41, and the fuel tank 5) is lower than the reference pressure "d". In this case, an amount of air entering the fuel tank 5 from outside is less than a threshold value, so that airtightness of the fuel tank 5 is fully achieved.

Therefore, evaporation generated inside the fuel tank 5 is not emitted to outside beyond the threshold value, and an amount of the evaporation leak is within the tolerance level. Thus, the ECU 4 determines that the evaporation leak from the fuel tank 5 is within the tolerance level, if the pressure of the first pump passage 43 is lower than the reference pressure "d", like this example.

In contrast, at the timing t5, if the pressure of the first pump passage 43 does not become lower than the reference pressure, the amount of air entering the fuel tank 5 from outside is determined to be larger than the threshold value, because the inside pressure of the fuel tank 5 is lowered. Therefore, evaporation generated inside the fuel tank 5 is emitted to outside beyond the threshold value, and it is determined that the evaporation leak is generated beyond the tolerance level. Thus, when the pressure of the first pump passage 43 does not become lower than the reference pressure "d", the ECU 4 determines that the evaporation leak from the fuel tank 5 exceeds the tolerance level.

In this case, the ECU 4 lights an alarm lamp of a dashboard (not shown), for example, at the next operation time of the engine. A driver of the vehicle can know that the evaporation leak is generated beyond the tolerance level. In addition, the predetermined period defined from the timing t4 to the timing t5 is set up in consideration of properties of the pump 11 and capacity of the fuel tank 5, for example.

In S109, the ECU 4 stops the pump 11 and the switching valve 30 at a timing t6 shown in FIG. 5. The switching valve 30 becomes to have the state of FIG. 2, and the pump 11 is stopped, so that the inside pressure of the first pump passage 43 and the fuel tank 5 becomes equal to an atmospheric pressure. After S109, the ECU 4 escapes from the processing of FIG. 4, and the check of evaporation leak is ended.

According to the first embodiment, the reference pressure "d" is computed only by detecting the closed-state pressure "a" and the open-time pressure "b" using the pressure sensor 13. Evaporation leak can be checked by comparing a pressure detected when the fuel tank 5 is decompressed with the reference pressure "d". That is, it is unnecessary to make fluid to actually flow in a reference orifice for detecting and calculating the reference pressure. The reference orifice is eliminated in the first embodiment, so that detection accuracy of the reference pressure is no longer lowered by foreign objects that close the reference orifice.

Therefore, the reference pressure "d" is computable with high precision, and the calculation precision of the reference pressure can be maintained as high. As a result, the detection precision of evaporation leak can be restricted from being lowered. Thus, high-precision evaporation leak check can be carried out for a long time. Moreover, because the reference orifice is not needed, the evaporation leak check system 1 can be simplified, and manufacture cost of the system 1 can be reduced.

Further, the ECU 4 controls the pump 11 in a manner that inside of the first pump passage 43, the tank passage 41, and the fuel tank 5 is decompressed. The closed-state pressure "a" and the open-time pressure "b" can be detected by the decompressing. Moreover, while the evaporation leak is checked by the ECU 4, fuel evaporated from the fuel tank is prevented from flowing out from minute gap of the fuel tank 5, because the inside of the fuel tank 5 is decompressed.

Furthermore, the tolerance level (threshold value) of the evaporation leak can be changed only by changing parameters such as $\alpha_2$, $A_2$ of the expression E3. Therefore, even when a standard of emission control of evaporation fuel is changed, the tolerance level of the check system 1 can be easily and flexibly changed.

Second Embodiment

Figure 7:
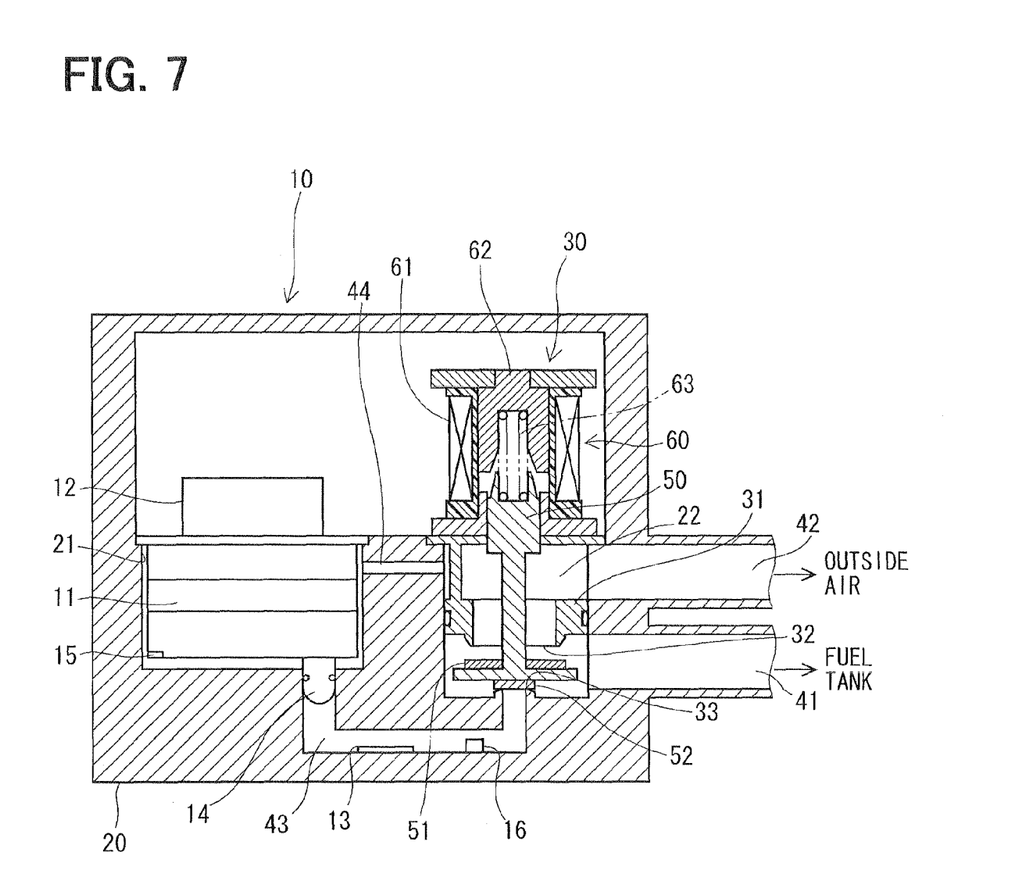
FIG. 7 is a cross-sectional view illustrating a check module of an evaporation leak check system according to a second embodiment.

A check module 10 of an evaporation leak check system according to a second embodiment is shown in FIG. 7. Compared with the first embodiment, the check module 10 of the second embodiment further has a flow rate sensor 16 as a flow rate detector. The sensor 16 is arranged in the first pump passage 43, and detects a flow rate of air flowing through the first pump passage 43.

Figure 8:
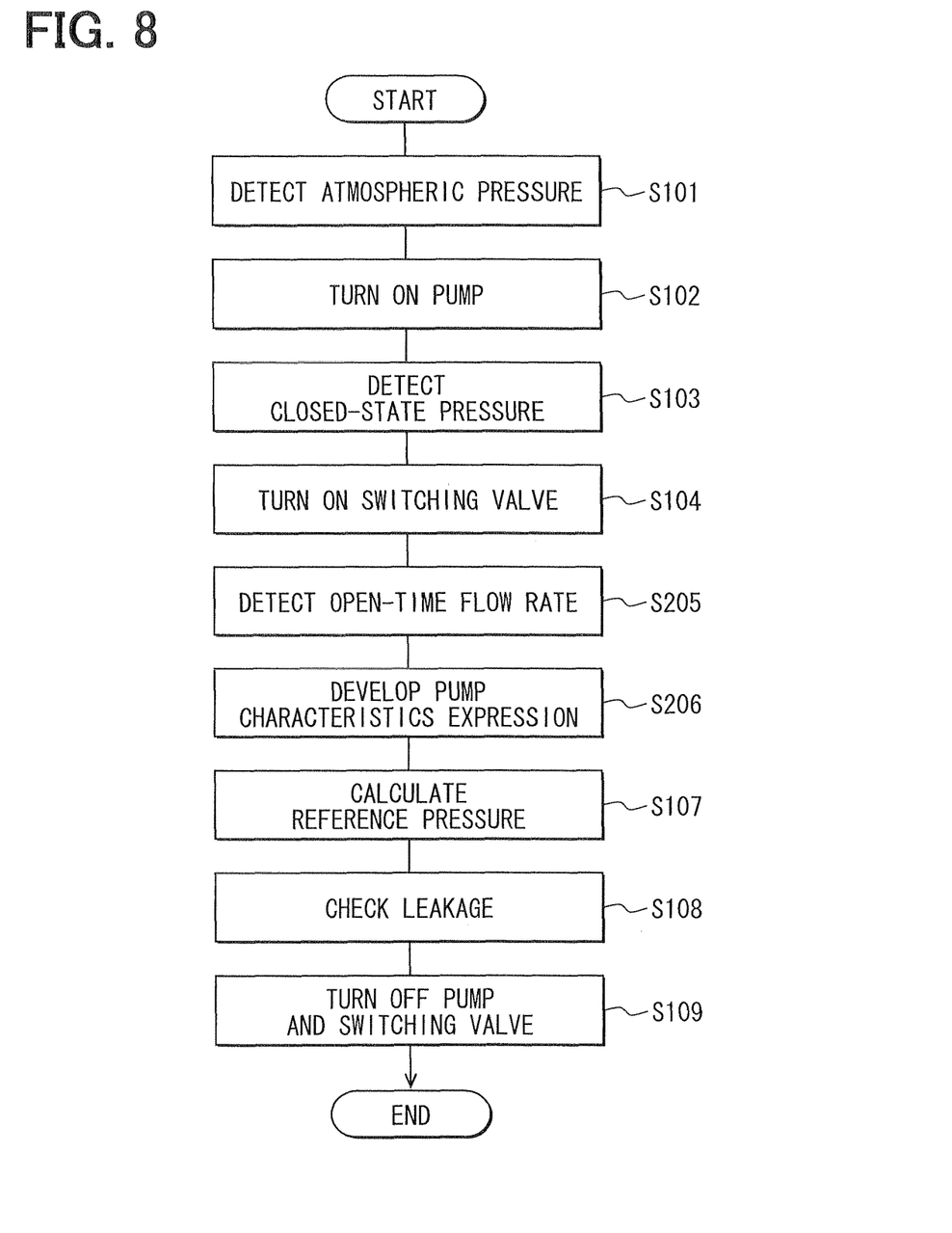
FIG. 8 is a flow chart illustrating a process of checking evaporation leak by the evaporation leak check system of the second embodiment.

Next, operation of the check system is explained based on FIG. 8. A processing of FIG. 8 is performed by the ECU 4 so as to check the evaporation leak. The flow of FIG. 8 is started when a predetermined period passes after the engine is stopped, similarly to the first embodiment. S101-S104 of FIG. 8 are similar to S101-S104 of FIG. 4 of the first embodiment, so that description of S101-S104 of FIG. 8 is omitted, for convenience.

S205 is performed immediately after S104 is finished, and the ECU 4 operates as an open-time flow rate detector that detects an open-time flow rate. The open-time flow rate is a flow rate of air flowing through the first pump passage 43 when the space between the first pump passage 43 and the tank passages 41 is opened in the state where the pump 11 is active.

The ECU 4 memorizes a value of signal output from the flow rate sensor 16 immediately after the timing t4 of FIG. 5 in the RAM as a value corresponding to the open-time flow rate. Here, the value corresponding to the open-time flow rate is set as "c".

In S206, the ECU 4 operates as a pump characteristics expression developer that develops an expression of pump characteristics of the pump 11. Specifically, the expression of pump characteristics of the pump 11 is developed based on the closed-state pressure "a" detected at S103, the open-time flow rate "c" detected at 5205 and "an expression of flow rate characteristic of the first pump passage 43".

The ECU 4 calculates an open-time pressure of the first pump passage 43 by incorporating the open-time flow rate "c" into the "Q" of the expression E1. The calculated open-time pressure is set as "b".

The ECU 4 calculates $K_1$ and $K_2$ of the expression E2 using the closed-state pressure "a", the open-time flow rate "c" and the open-time pressure "b". The inclination $K_1$ may be represented by a formula of c/(b−a).

That is, the ECU 4 calculates $K_1$ and $K_2$ based on the detected closed-state pressure "a" and the detected open-time flow rate "c", thereby developing the expression E2 of the pump characteristics of the pump 11 at the timing of t4.

S107-S109 of FIG. 8 are similar to S107-S109 of FIG. 4 of the first embodiment, so that description of S107-S109 of FIG. 8 is omitted.

According to the second embodiment, the reference pressure "d" is computed only by detecting the closed-state pressure "a" and the open-time flow rate "c" using the pressure sensor 13 and the flow rate sensor 16. Evaporation leak can be checked by comparing a pressure detected when the fuel tank 5 is decompressed with the reference pressure "d". That is, it is unnecessary to make fluid to actually flow in the reference orifice for detecting and calculating the reference pressure. The reference orifice is eliminated in the second embodiment, so that detection accuracy of the reference pressure is no longer lowered by foreign objects that close the reference orifice.

Therefore, the reference pressure "d" is computable with high precision, and the calculation precision of the reference pressure can be maintained as high. As a result, the detection precision of evaporation leak can be restricted from being lowered, similarly to the first embodiment.

Third Embodiment

Operation of an evaporation leak check system according to a third embodiment is explained based on FIGS. 2-4, 9 and 10. While construction of the system of the third embodiment is approximately the same as that of the first embodiment, a rotating direction of a motor that drives a pump is different from the first embodiment.

In the third embodiment, when the pump 11 is activated, the motor 12 is rotated in a direction opposite from that of the first embodiment. Therefore, air in the second pump passage 44 is drawn into the pump 11 via an outlet port 15, and is discharged into the first pump passage 43 via an inlet port 14. Therefore, the first pump passage 43 is compressed if the pump 11 is driven in a state that the space between the first pump passage 43 and the tank passage 41 is closed, as shown in FIG. 2.

If the pump 11 is driven in the state of FIG. 3 where the space between the first pump passage 43 and the tank passage 41 is opened and where the space between the tank passage 41 and the open passage 42 is closed, the first pump passage 43, the tank passage 41 and the fuel tank 5 are compressed.

The processing of FIG. 4 is performed by the ECU 4 in the third embodiment, similarly to the first embodiment. Because the pump 11 compresses the first pump passage 43, values of the detected closed-state pressure and the detected open-time pressure are changed from negative into positive, compared with the first embodiment.

Further, a value of the characteristics expression used for calculating a reference pressure is changed from negative into positive, compared with the first embodiment. S101 of FIG. 4 is the same between the third embodiment and the first embodiment, so that description of S101 is omitted.

In S102, the ECU 4 activates the pump 11. At this time (timing t2 shown in FIG. 9), the inside of the first pump passage 43 is compressed because the space between the first pump passage 43 and the tank passage 41 is closed.

In S103, the ECU 4 operates as a closed-state pressure detector that detects a closed-state pressure. The closed-state pressure is a pressure of the first pump passage 43 when the pump 11 is driven in a state that the space between the first pump passage 43 and the tank passages 41 is closed. The ECU 4 calculates and memorizes a value corresponding to the closed-state pressure by subtracting the value corresponding to the atmospheric pressure memorized in S101 from a value of signal output from the sensor 13 at a timing t3 shown in FIG. 9, in the RAM.

Here, the value corresponding to the closed-state pressure is set as "f". Because the closed-state pressure is higher than the atmospheric pressure, "f" has a positive value.

Figure 9:
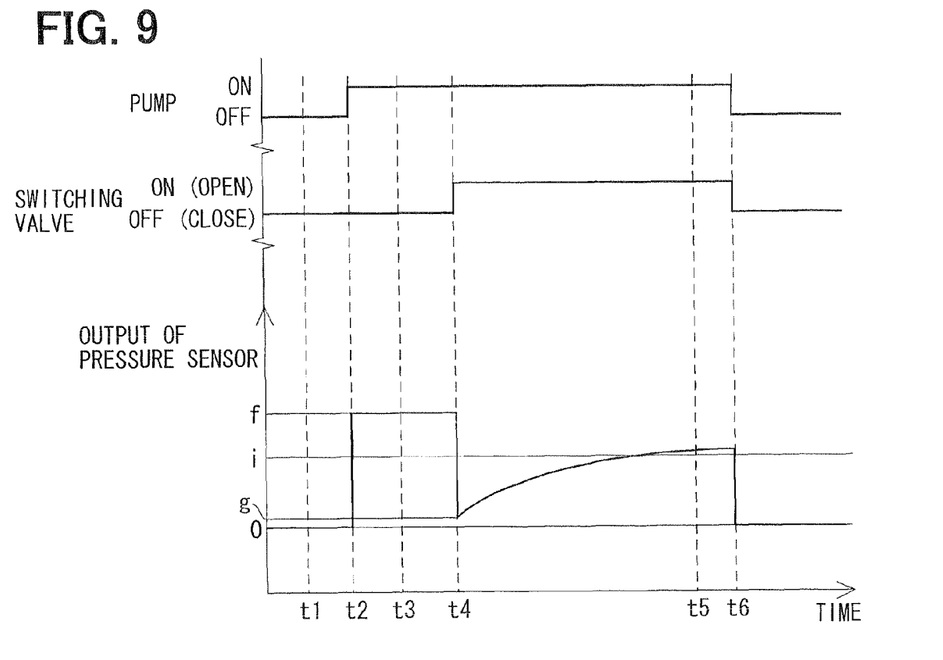
FIG. 9 is a time chart illustrating a change in output of a pressure sensor of an evaporation leak check system according to a third embodiment.

In S104, the ECU 4 activates the switching valve 30 at timing t4 shown in FIG. 9, thereby, the switching valve 30 has the state of FIG. 3.

S105 is executed immediately after S104 is finished, and the ECU 4 operates as an open-time pressure detector that detects an open-time pressure. The open-time pressure is a pressure of the first pump passage 43 when the space between the first pump passage 43 and the tank passages 41 is opened in the state where the pump 11 is driven.

The ECU 4 calculates and memorizes a value corresponding to the open-time pressure by subtracting the value corresponding to the atmospheric pressure memorized in S101 from a value of signal output from the sensor 13 immediately after the timing t4, in the RAM.

Here, the value corresponding to the open-time pressure is set as "g". Because the open-time pressure is higher than the atmospheric pressure, "g" has a positive value, similarly to "f".

In S106, the ECU 4 operates as a pump characteristics expression developer that develops an expression of pump characteristics of the pump 11. Specifically, the expression of the pump characteristics of the pump 11 is developed from the closed-state pressure "f" detected at S103, the open-time pressure "g" detected at S105 and "an expression of flow rate characteristic of the first pump passage 43".

The expression of flow rate characteristic of the first pump passage 43 is a following expression E4 that indicates a relationship between a pressure (P) and a flow rate (Q) when air is made to flow through the first pump passage 43 having a predetermined passage area in a state where a positive pressure is applied to the passage 43.

$$Q = \alpha_1 A_1 \sqrt{(2P/\rho)} \quad (E4)$$

$\alpha_1$ is a flow rate coefficient of the first pump passage 43, and has a predetermined value. $A_1$ is the predetermined passage area of the first pump passage 43. $\rho$ is a density of air (0° C., 1 atm), and has a predetermined value. P is a positive value. If the expression E4 is shown in a graph, a curve L4 of FIG. 10 is obtained.

The expression of the pump characteristics of the pump 11 is a following expression E5 that indicates a relationship between a pressure (P) and a flow rate (Q) of fluid discharged from the pump 11, and is determined by properties of the pump 11.

$$Q = K_3 P + K_4 \quad (E5)$$

Figure 10:
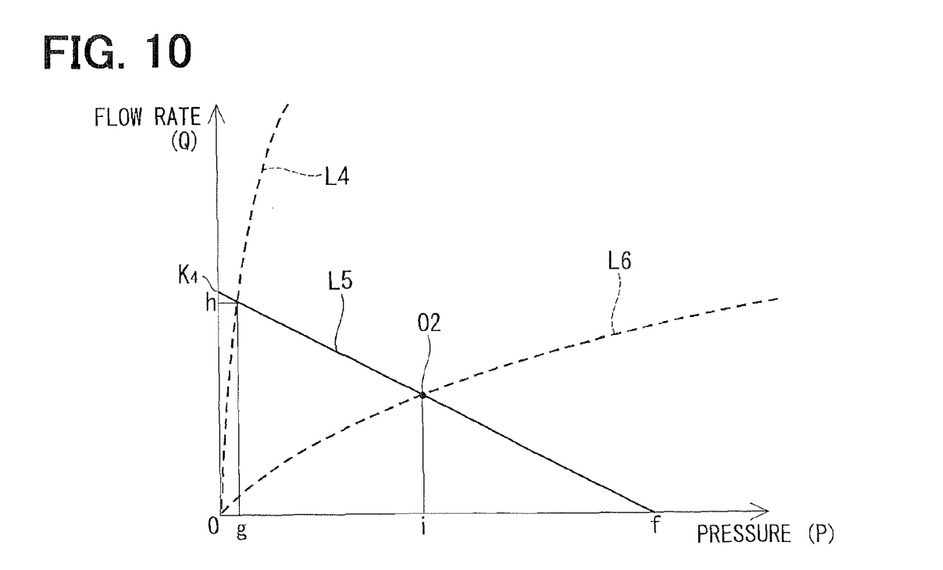
FIG. 10 is a graph illustrating a pump characteristics expression of a pump of the evaporation leak check system of the third embodiment.

If the expression E5 is shown in a graph, a linear line L5 of FIG. 10 is obtained. $K_3$ is an inclination of the linear line L5 that represents a change ratio in the flow rate relative to the pressure. $K_4$ is a flow rate at a time of no-load.

The ECU 4 calculates an open-time flow rate of the first pump passage 43 by incorporating the open-time pressure "g" into the "P" of the expression E4. The calculated open-time flow rate is set as "h".

The ECU 4 calculates $K_3$ and $K_4$ of the expression E5 using the closed-state pressure "f", the open-time pressure "g" and the open-time flow rate "h". For example, the inclination $K_3$ is represented by a formula of h/(g−f).

That is, the ECU 4 calculates $K_3$ and $K_4$ based on the detected closed-state pressure "f" and the detected open-time pressure "g", thereby developing the expression E5 of the pump characteristics of the pump 11 at the timing of t4.

In S107, the ECU4 calculates a reference pressure as a reference pressure calculator. Specifically the reference pressure is computed by calculating an intersection point between the expression E5 of the pump characteristics of the pump 11 developed in S106 and "an expression of flow rate characteristic of an orifice having a predetermined passage area."

The expression of flow rate characteristic of the orifice having the predetermined passage are is a following expression E6 that indicates a relationship between a pressure (P) and a flow rate (Q) when air is made to flow through the orifice having the predetermined passage area into which a positive pressure is applied.

$$Q = \alpha_2 A_2 \sqrt{(2P/\rho)} \quad (E6)$$

$\alpha_2$ is a flow rate coefficient of the orifice, and has a predetermined value memorized in the ROM. $A_2$ is the predetermined passage area of the orifice and is memorized in the ROM. $\rho$ is a density of air (0° C., 1 atm), and has a predetermined value memorized in the ROM. P is a positive value. The orifice is not actually arranged in the housing 20.

If the expression E6 is shown in a graph, a curve L6 of FIG. 10 is obtained. For example, a passage diameter of the orifice is set as $\phi 0.5$ mm.

The ECU 4 calculates an intersection point O2 between the expression E5 (L5) and the expression E6 (L6), so as to obtain the reference pressure. A pressure value of the intersection point O2 is set as the reference pressure "i", as shown in FIG. 10 That is, the reference pressure "i" corresponds to a pressure defined when air is made to pass through the orifice with the passage diameter of $\phi 0.5$ mm in a state where a positive pressure is applied to the orifice by driving the pump 11.

In S108, the ECU 4 operates as a leak check portion, and determines whether evaporation leak from the fuel tank 5 is within a tolerance level or not. Specifically, the pump 11 is activated for a predetermined period in a state where the space between the first pump passage 43 and the tank passages 41 is opened. At this time (timing t5 shown in FIG. 9), the pressure detected by the pressure sensor 13 and the reference pressure "i" obtained in S107 are compared with each other.

As shown in FIG. 9, at the timing t4, the switching valve 30 has the state of FIG. 3 and the pump 11 is in the driven state. Therefore, inside pressure of the first pump passage 43, the tank passage 41, and the fuel tank 5 is raised after the timing t4.

At timing t5, i.e., when a predetermined period is elapsed from the timing t4, the pressure detected by the pressure sensor 13, i.e., the inside pressure of the first pump passage 43, the tank passage 41, and the fuel tank 5, is higher than the reference pressure "i". In this case, an amount of air leaked from the fuel tank 5 is less than a threshold value, so that the airtightness of the fuel tank 5 is fully achieved.

Therefore, fuel evaporation generated from the fuel tank 5 is not emitted to outside beyond the threshold value, and an amount of the evaporation leak is within the tolerance level. Thus, the ECU 4 determines that the evaporation leak from the fuel tank 5 is within the tolerance level when the pressure of the first pump passage 43 is higher than the reference pressure "i".

In contrast, at the timing t5, if the pressure of the first pump passage 43 does not become higher than the reference pressure "i", the amount of air leaked from the fuel tank 5 is determined to be larger than the threshold value, because the inside pressure of the fuel tank 5 is raised. Therefore, evaporation generated inside the fuel tank 5 is emitted to outside beyond the threshold value, and it is determined that the evaporation leak is generated beyond the tolerance level. Thus, when the pressure of the first pump passage 43 does not become higher than the reference pressure "i", the ECU 4 determines that the evaporation leak from the fuel tank 5 exceeds the tolerance level.

In this case, the ECU 4 lights an alarm lamp of a dashboard (not shown), for example, at the next operation time of the engine. A driver of the vehicle can know that the evaporation leak is generated beyond the tolerance level.

In S109, the ECU 4 stops the pump 11 and the switching valve 30 at a timing t6 shown in FIG. 9. The switching valve 30 has the state of FIG. 2, and the pump 11 is stopped, so that the inside pressure of the first pump passage 43 and the fuel tank 5 becomes equal to an atmospheric pressure. After S109, the ECU 4 escapes from the processing of FIG. 4, and the check of evaporation leak is ended.

According to the third embodiment, the ECU 4 drives the pump 11 in a manner that the inside of the first pump passage 43, the tank passage 41 and the fuel tank 5 is compressed. Thus, the closed-state pressure "f" and the open-time pressure "g" are detected by compressing the inside of the first pump passage 43, the tank passage 41 and the fuel tank 5, so that evaporation leak can be checked.

Other Embodiment

In the second embodiment, the ECU 4 may drive the pump 11 in a manner that the inside of the first pump passage 43, the tank passage 41 and the fuel tank 5 is compressed. In this case, evaporation leak can be checked, similarly to the third embodiment.

In the second embodiment, the open-time flow rate is detected by the flow rate sensor 16, and the pump characteristics expression of the pump 11 is developed based on the open-time flow rate, the closed-state pressure and the flow rate characteristics expression of the first passage 43.

Alternatively, the open-time pressure may be detected by the pressure sensor 13, and the pump characteristics expression of the pump 11 may be developed based on the open-time pressure, the closed-state pressure and the flow rate characteristics expression of the first pump passage 43.

In this case, the pump characteristics expression of the pump 11 is developed based on the open-time pressure detected by the sensor 13 in addition to the open-time flow rate detected by the flow rate sensor 16, so that the pump characteristics expression of the pump 11 can be more accurate.

Therefore, the detection accuracy of the evaporation leak can be raised more. Further, even if the detection of the open-time flow rate becomes impossible due to break of the flow rate sensor 16, the open-time pressure is detected by the pressure sensor 13. Thus, the check of the evaporation leak is possible by developing the pump characteristics expression of the pump 11.

The brushless motor may be changed into a motor with brush.

Such changes and modifications are to be understood as being within the scope of the present invention as defined by the appended claims.

What is claimed is:

1. An evaporation leak check system that checks fuel evaporation leak from a fuel tank by forming a pressure difference between inside and outside of the fuel tank, the evaporation leak check system comprising:
   a pump;
   a motor that drives the pump;
   a pump passage having a first end connected to the pump and a second end;
   a first passage having a first end connected to the fuel tank and a second end connected to the second end of the pump passage;
   a second passage having a first end released to atmospheric air and a second end connected to the second end of the first passage;
   a switching portion configured to open a space between the first passage and the second passage when a space between the pump passage and the first passage is closed, and configured to close the space between the first passage and the second passage when the space between the pump passage and the first passage is opened;
   a pressure detector arranged in the pump passage, the pressure detector detecting an inside pressure of the pump passage;
   a flow rate detector arranged in the pump passage, the flow rate detector detecting a flow rate of fluid flowing through the pump passage;
   an adsorbent arranged in the first passage, the adsorbent adsorbing evaporation fuel generated in the fuel tank; and
   a controller that controls an activation of the pump and an operation of the switching portion, wherein the controller has
      a closed-state pressure detector that detects a closed-state pressure corresponding to the pressure detected by the pressure detector when the pump is driven in a state that the space between the pump passage and the first passage is closed by the switching portion,
      an open-time flow rate detector that detects an open-time flow rate corresponding to the flow rate detected by the flow rate detector immediately after the space between the pump passage and the first passage is opened by the switching portion in a state that the pump is operated,
      a pump characteristics expression developer that develops a pump characteristics expression of the pump based on the closed-state pressure, the open-time flow rate and a flow rate characteristics expression of the pump passage,
      a reference pressure calculator that calculates a reference pressure by calculating an intersection point between the pump characteristics expression of the pump and a flow rate characteristics expression of an orifice having a predetermined passage area, and
      a leak check portion that determines whether a leak of the fuel evaporation generated from the fuel tank is within an allowable range or not by comparing the reference pressure and a pressure detected by the pressure detector when the pump is driven for a predetermined period in a state that the space between the pump passage and the first passage is opened by the switching portion.

2. The evaporation leak check system according to claim 1, wherein the controller further has an open-time pressure detector that detects an open-time pressure corresponding to the pressure detected by the pressure detector immediately after the space between the pump passage and the first passage is opened by the switching portion in a state that the pump is operated, and the pump characteristics expression developer develops the pump characteristics expression of the pump based on the closed-state pressure, the open-time pressure, and the flow rate characteristics expression of the pump passage.

3. The evaporation leak check system according to claim 1, wherein the controller controls the activation of the pump in a manner that the pump passage, the first passage and the fuel tank are decompressed when the pump is driven.

4. The evaporation leak check system according to claim 1, wherein the controller controls the activation of the pump in a manner that the pump passage, the first passage and the fuel tank are compressed when the pump is driven.

* * * * *